United States Patent Office 3,321,726
Patented May 23, 1967

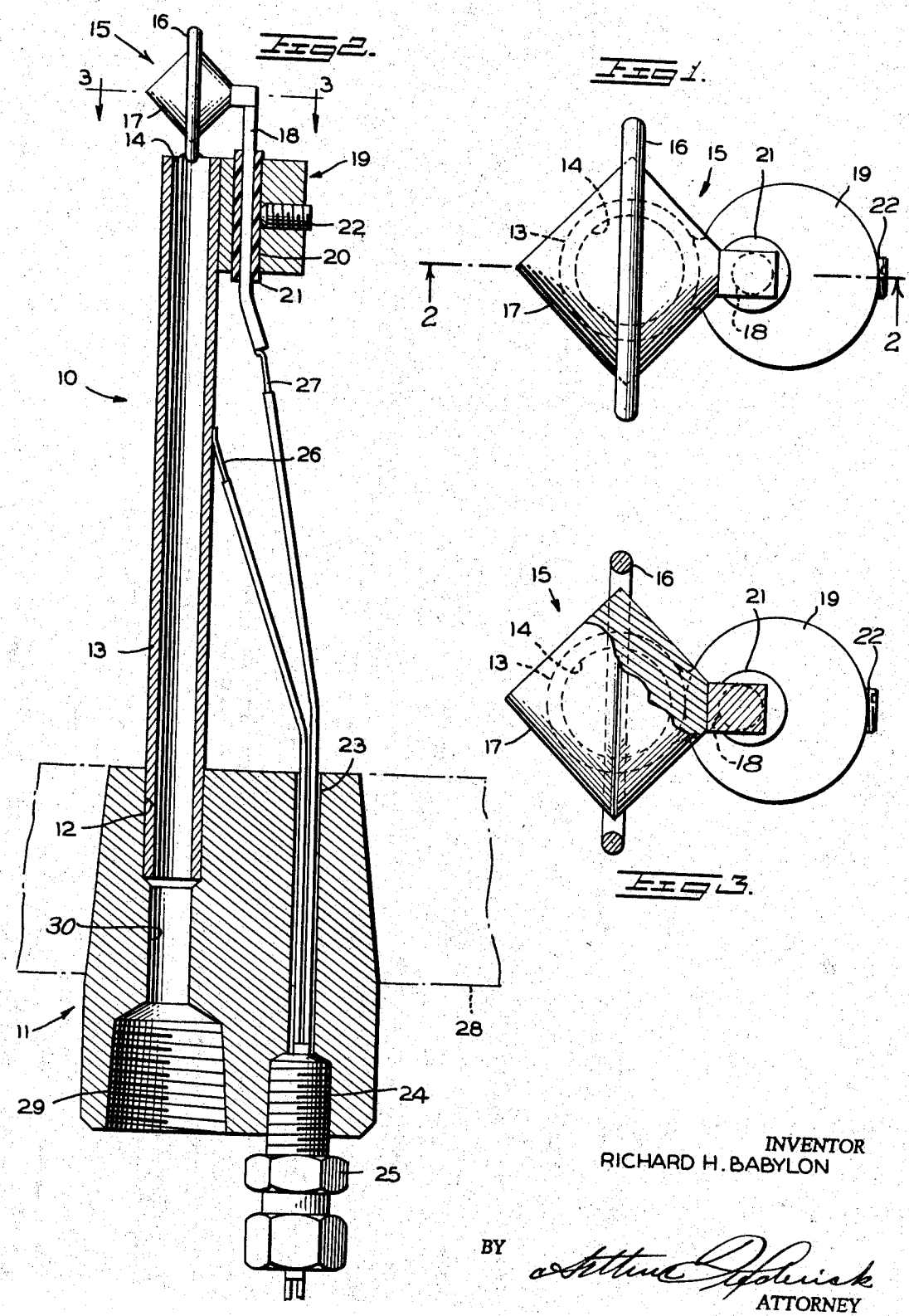

3,321,726
AEROSOL PROBE
Richard H. Babylon, Hagerstown, Md., assignor to Frick Company, Waynesboro, Pa., a corporation of Pennsylvania
Filed Sept. 29, 1965, Ser. No. 491,150
10 Claims. (Cl. 338—34)

ABSTRACT OF THE DISCLOSURE

An aerosol detection probe comprising an elongated, hollow member projecting from a mounting member into a gaseous fluid stream to be sensed. An electrode assembly consisting of closely spaced electrodes is mounted on the distal end portion of the hollow member. The hollow member is connected to a source of gaseous fluid under pressure and is constructed and arranged to discharge such fluid in impingement against the electrodes to thereby remove the liquid therefrom and restore the liquid sensing effectiveness of the probe. The electrodes are suitably insulated from each other and are connected to a source of electric current including a resistance measuring means.

---

This invention relates to fluid probes and more particularly to a probe for sensing the presence of entrained liquid in a gaseous fluid stream. Still more specifically the invention pertains to probes for sensing the presence of finely-dispersed droplets in a gaseous fluid stream, generally referred to as an aerosol.

Heretofore aerosol probes, having electrodes for sensing moisture content of a gaseous fluid in a conduit or tank, have been relatively large and bulky and consequently interfered with fluid flow; or they have been structurally or functionally complex and costly. In addition, separate means had to be provided to clean or remove moisture from the probe so as to restore the probes ability to sense further flow of fluid.

It is, therefore, one of the objects of the present invention to provide an aerosol probe of simple yet rugged construction which does not materially interfere with normal fluid flow. Another object of this invention is to provide a probe having closely spaced electrodes which is quickly and easily restored to sensing effectiveness.

Accordingly, the present invention contemplates a novel probe comprising an electrode assembly having electrodes mounted in closely spaced coaxial relationship to each other at the distal end portion of an elongated hollow support member which is secured and extends from a mounting body. The electrodes are each connected to an electric circuit which includes a source of electric current and an electric indicating means, such as an ohmmeter. The electric wires extend from the electrodes into the mounting body and are secured therein by an electrical connector. Insulating means is provided for electrically insulating the electrodes from each other. Means is provided in the mounting body for communicating a fluid system, including a source of high pressure fluid, such as steam, air, high pressure gaseous refrigerant or the like, and a flow control valve with the hollow support member so that the latter conducts high pressure and/or high temperature fluid when desired. The hollow support member has a fluid discharge opening located in relation to the electrodes to direct high pressure and/or high temperature fluid into impingement against the electrodes to thereby remove liquid within the space between the electrodes and from the electrodes. A valve means is disposed exteriorly of the probe to control flow of fluid to and through the hollow support member.

The electric circuit which includes the indicating means may function to measure the change in either electrical resistance or capacitance of the electric circuit by reason of the presence of liquid in the gaseous fluid between the electrodes. This principle of electrically detecting liquid in a fluid stream is disclosed in U.S. Patent No. 2,349,992 to Schrader.

The aerosol probe according to this invention has application to any system where it is desirable to detect the presence of any liquid in a relatively fine state of dispersion in a gaseous fluid. As for example the aerosol probe has application to refrigerating systems to detect the presence of entrained liquid refrigerant in the gaseous refrigerant being conducted to the compressor before excessive wear or damage to the compressor. It is well known that liquid carry-over into a compressor, particularly reciprocating compressors, can result in excessive wear and/or serious damage to the compressor by the liquid refrigerant diluting the compressor lubricating oil or large quantities of entrained liquid or slugs of liquid causing valve breakage and/or more complicated destruction inside the compressor. Clearly, the aerosol probe of this invention is particularly useful in refrigeration systems to timely detect liquid carry-over in the gaseous refrigerant before it can adversely affect the compressor.

The invention will be more fully understood from the following description when considered in connection with the accompanying drawings in which:

FIG. 1 is a plan view of the aerosol probe according to this invention;

FIG. 2 is a longitudinal sectional view taken substantially along line 2—2 of FIG. 1, on a smaller scale; and FIG. 3 is a cross sectional view taken along line 3—3 of FIG. 2 and shown on the same scale as FIG. 1.

Now referring to the drawings and more particularly to FIGS. 1 and 2, 10 generally designates the aerosol probe assembly according to this invention. The aerosol probe 10 comprises a mounting body or plug 11 of any suitable material, preferably of corrosion resistant material, which is bored at 12 to receive one end of an elongated hollow support member 13. Support member 13 may be tubular in construction to provide a discharge opening 14 at the distal end thereof. The support member, hereinafter referred to as a purge tube, is suitably secured in bore 12 of body 11 by soldering, brazing, welding, swaging or the like. An electrode assembly 15 is mounted on the distal end portion of purge tube 13.

The electrode assembly 15 comprises a first electrode 16 which is ring shaped and a second electrode 17 comprising juxtaposed conical parts joined at a common base. Electrode 16 is secured, as by welding, brazing, soldering, bonding or the like, to the distal end of purge tube 13 with the plane of the ring co-extensive with the longitudinal axis of purge tube 13. Electrode 17 is supported in coaxial, closely spaced relationship within electrode 16 by a supporting arm 18 which is secured within a support collar 19. The collar 19 has a bore 20 lined by sleeve 21 of electrical insulating material, such as tetrafluoroethylene, commercially known by the trademark Teflon. Arm 18 is secured in collar 19 by a set screw 22.

To electrically connect electrodes 16 and 17 to an electrical circuit (not shown) including a low voltage source and an indicating means (not shown) for measuring resistance or capacitance of the electric circuit, body 11 has a bore 23 extending therethrough, which bore 23 is counterbored at 24 and threaded to receive an electrical connector 25 of any suitable type, such as a two-piece connector and electric amplifier commercially known as Conax. "TG" Transducer Gland, Catalogue No. MTG24–2, Type A with Teflon insulator. Any connector which will effect good electrical contact without twisting of electrical leads will be satisfactory. Insulation covered electric leads 26 and 27 are provided which extend through bore 23 and are electrically connected at one end by soldering, brazing, welding or the like to purge tube 13 and support arm 18 of electrode 17, respectively, and at their opposite ends to connector 25.

To provide means for clearing the electrode assembly 15 of liquid and thereby restore its sensing effectiveness, body 11 has a bore 30 which is counterbored and threaded at 29 to receive a pipe connection (not shown). Bore 30 serves as a passageway to communicate the interior of purge tube 13 with the pipe connection (not shown), the pipe connection being in communication with a suitable fluid system (not shown) including a source of high pressure and/or high temperature fluid, as for example steam, gaseous refrigerant, air or the like, and a flow control valve means (not shown). In the use of probe 10 in a refrigeration system, the source of fluid could be high pressure and temperature gaseous refrigerant from the refrigerant condenser. The flow of fluid into pipe connection (not shown), bore 30 and into and through the interior of purge tube 13, is controlled by the valve means (not shown) in the fluid system (not shown).

In operation of aerosol probe 10, electrode 17 is adjusted in collar 19 so that it is positioned concentrically within ring electrode 16 to provide a uniform space or gap between the electrodes. The dimensions of ring electrode 16 and electrode 17 are such that the annular space or gas therebetween is between .020 inch and .120 inch for applications involving detection of liquid refrigerant in refrigerating systems. When the desired adjustment is made electrode 17 is fixed in position by tightening set screw 22. The aerosol probe 10, including connector 25 and possibly including the pipe connection (not shown) is inserted in an opening in the wall 28 of a conduit or tank (not shown). The opening is preferably provided with tapered walls complementary to the tapered periphery of body or plug 11. Plug 11 is positioned in the opening in wall 28 so that the support collar 19 is downstream in relation to the direction of flow of fluid and with the axis of electrode 17 within about 10° of parallelism with the longitudinal centerline of the conduit or tank. The body or plug 11 is then secured in the opening of wall 28 by suitable means such as brazing, welding, soldering or the like.

After the probe is secured in place electric leads 26 and 27 are electrically connected to the circuit, including a source of low voltage and an instrument for measuring and indicating change in capacitance of the circuit or electrical resistance in the circuit, by coupling together the two-piece connector 25. The probe is also connected, through the pipe connection (not shown) secured to body 11 at 29, to a source of high pressure and/or high temperature fluid.

When the gaseous fluid entrains liquid in a fine dispersion of droplets or slugs of liquid, such liquid will bridge the space or gap between the electrodes 16 and 17 and result in reducing the resistance of current flow across the gap between the electrodes or a change in the capacitance of the circuit. This change of resistance or capacitance is measured and will be proportionate to the degree or quantity of liquid carry-over and such change measured and indicated. Suitable corrective steps may be taken to manually or automatically eliminate the entrainment of liquid in the gaseous fluid.

To clear the electrode assembly 15 of probe 10 of liquid so as to restore the sensing effectiveness of the probe, the flow control valve means (not shown) in the fluid system (not shown) is actuated to permit high pressure and/or high temperature gaseous fluid to pass into bore 30, interior of purge tube 13 and discharge from opening 14 into impingement against the electrode assembly. The high pressure and/or high temperature fluid forces the liquid from the electrode assembly including any other foreign matter adhering to the electrode assembly, and/or may clear the electrode assembly by vaporizing the liquid as in the case of liquid refrigerant. After the electrode assembly 15 has been cleared and cleaned, it is in a condition to sense further flows of gaseous fluid and detect the presence of entrained liquid.

It is believed now readily apparent that the present invention provides an aerosol probe which is relatively simple in construction and provides negligible resistance to flow of fluid being monitored. It is also an aerosol probe which has a means for quickly clearing the electrodes of liquid or other foreign matter to restore the probe to its sensing effectiveness. Furthermore, it is a probe which is capable of functioning under extremely low voltages so that it is not hazardous to personnel touching the purge tube and will not heat. Still further, it is a probe which has no moving parts and, therefore, has a high degree of reliability. It is also a probe wherein its performance is not affected by vibrations transmitted to the electrodes either mechanically or pneumatically because of the relatively low amplitude of such vibration.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

I claim:
1. A probe for sensing liquid entrained in a gaseous fluid stream confined in a conduit in combination with a source of gaseous fluid under pressure and a source of electric current, the probe comprising
   (a) a mounting body secured in said conduit,
   (b) an elongated hollow member secured at one end in said body and projecting from the latter,
   (c) an electrode assembly secured to the distal end portion of said hollow member so as to be exposed to said gaseous fluid stream in said conduit,
   (d) passage means associated with said mounting body for communicating said hollow member with said source of gaseous fluid, and
   (e) means associated with said body for electrically connecting said electrodes to said source of electric current,
   (f) said hollow member having a discharge opening adjacent said electrode assembly to emit the gaseous fluid into impingement against the electrode assembly to thereby remove liquid adhering to the electrode assembly and restore the latters sensing effectiveness.

2. The apparatus of claim 1 wherein said elongated hollow member is a metallic tube.

3. The apparatus of claim 1 wherein said electrode assembly comprises two closely spaced coaxially disposed electrodes.

4. A probe for sensing liquid entrained in a gaseous fluid stream confined in a conduit in combination with a source of gaseous fluid under pressure and a source of very low voltage current, the probe comprising
   (a) a mounting body secured in said conduit,
   (b) an elongated hollow member secured at one end in said body and projecting from the latter into said conduit,
   (c) an electrode means, including at least two closely spaced electrodes secured to the distal end portion of said hollow member so as to be exposed to said gaseous fluid stream in said conduit.
   (d) means associated with said body for electrically connecting said spaced electrodes to said source of very low voltage electric current,
   (e) passage means associated with said mounting body for communicating said hollow member with said source of gaseous fluid, and
   (f) insulating means for electrically insulating the means for electrically connecting the electrodes to a source of electric current,
   (g) said hollow member having a discharge opening adjacent said electrodes to emit gaseous fluid into impingement against the electrode assembly to thereby remove liquid adhering to the electrodes and thereby restore the latters sensing effectiveness.

5. The apparatus of claim 4 wherein said electrode means comprises a ring shaped electrode and a second electrode disposed substantially coaxially within said ring shaped electrode and dimensioned to lie in close spaced relationship with the inner surface of the ring shaped electrode.

6. The apparatus of claim 4 wherein said elongated hollow member is a metallic tube open at both ends.

7. The apparatus of claim 4 wherein said electrode means comprises a first electrode of ring shape and a second electrode having two justaposed conical surfaces disposed in closely spaced, coaxial relationship with the ring shaped electrode.

8. A probe for sensing liquid entrained in a gaseous fluid stream confined in a conduit in combination with a source of gaseous fluid under pressure and a source of very low voltage electric current, the probe comprising
 (a) a mounting body secured in said conduit,
 (b) an open ended tubular member secured at one end in said body and projecting from the latter,
 (c) an electrode assembly secured to the distal end portion of said tubular member so as to be disposed in said conduit,
 (d) said electrode assembly comprising
  (1) a ring shaped electrode and
  (2) a second electrode disposed in closely spaced coaxial relation to the ring shaped electrode,
 (e) means associated with said body for connecting the electrodes to a source of very low voltage current,
 (f) insulating means to electrically insulate the means connecting the ring and second electrode to a source of electric current,
 (g) passage means in and connected to said body to communicate the tubular member with said source of fluid so that fluid is conducted through and discharged from the distal open end of the tubular member into impingement against the ring shaped and second electrode to thereby remove liquid adhering to the electrodes and restore the electrode assembly to sensing effectiveness.

9. The apparatus of claim 8 wherein said second electrode has juxtaposed conical parts having a common base.

10. The apparatus of claim 8 wherein the space between the ring shaped and second electrode is within the range of about .020 inch to about .120 inch.

References Cited by the Examiner

UNITED STATES PATENTS

| 2,349,992 | 5/1944 | Schrader | 324—65 |
| 2,647,234 | 7/1953 | Pear | 73—336.5 |
| 2,741,119 | 4/1956 | Neel | 338—35 |
| 2,975,361 | 3/1961 | Holaday | 324—65 |
| 3,025,464 | 3/1962 | Bond | 73—304 |
| 3,176,222 | 3/1965 | Atkisson | 324—61 |
| 3,264,557 | 8/1966 | Heeps | 324—65 |

RICHARD M. WOOD, *Primary Examiner.*

W. D. BROOKS, *Assistant Examiner.*